Nov. 3, 1964   J. N. SIMPSON   3,154,788
SAFETY HAT ADJUSTABLE SUSPENSION
Filed Jan. 14, 1963
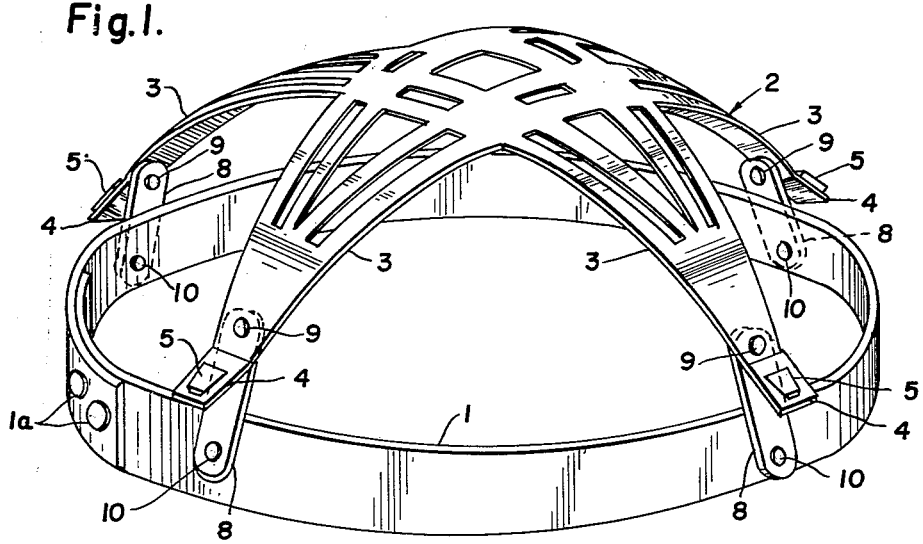
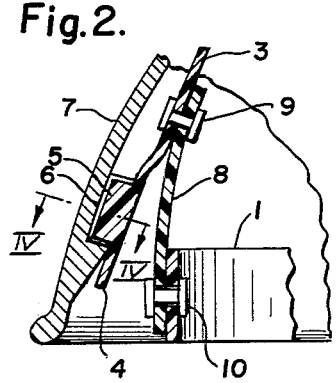
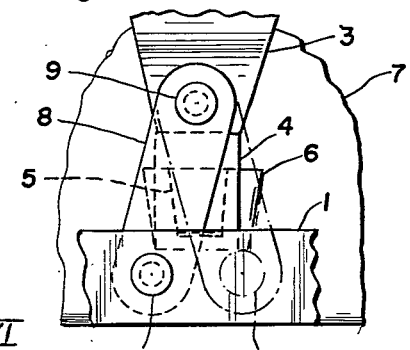
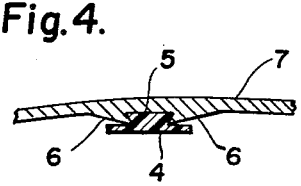
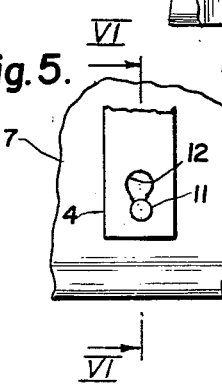
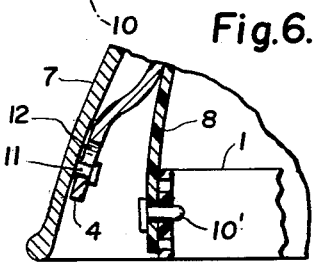
INVENTOR.
JACK N. SIMPSON
BY
*William J. Ruano*
his ATTORNEY 3,154,788
SAFETY HAT ADJUSTABLE SUSPENSION
Jack N. Simpson (Greenfields), Reading, Pa., assignor to The Electric Storage Battery Company, Philadelphia, Pa., a corporation of Pennsylvania
Filed Jan. 14, 1963, Ser. No. 251,357
2 Claims. (Cl. 2—3)

This invention relates to suspensions for safety hats or caps and, more particularly, to adjusting means thereof for providing a wide range of adjustment of the circumference of the headband, as well as to provide an easy and readily detachable connection to the hat or cap.

A disadvantage of conventional types of suspensions for safety hats and caps is that the headband is not adjustable in circumference over a sufficiently wide range to enable the same suspension to be used on wearers having widely different head sizes—also they are somewhat complicated in construction and expensive to manufacture, as well as not easily and quickly detachable from a safety hat or cap.

An object of the present invention is to provide a novel suspension for a safety hat and cap, which suspension is devoid of the above-named disadvantages and which will enable easy and quick adjustment of girths or sizes of the headband over a much wider range than heretofore possible.

A more specific objection of the invention is to provide an improved suspension of flexible material having pivotal legs disposed at the ends of the legs or spiders thereof to allow a wide adjustment of the girth of the headband without distortion of the suspension and which is quickly and easily detachable from or attachable to a safety hat or cap.

Other objects and advantages of the invention will become more apparent from a study of the following description, taken with the accompanying drawing wherein:

FIG. 1 is a perspective view of an adjustable suspension for a safety hat or cap embodying the principles of the present invention;

FIG. 2 is a fragmentary, slightly enlarged vertical cross-sectional view through a portion of the suspension and showing how it is connected to the safety hat;

FIG. 3 is an inside elevational view of a portion of the suspension shown in FIGS. 1 and 2;

FIG. 4 is a cross-sectional view taken along line IV—IV of FIG. 2;

FIG. 5 is a fragmentary, elevational view of an inside portion of the hat showing how end portion is attached; and, FIG. 6 is a cross-sectional view taken on line VI—VI of FIG. 5.

Referring more particularly to FIG. 1 of the drawing, numeral 1 denotes a headband made of any suitable flexible material, such as plastic material—for example, polyethylene or other suitable plastic material. The end portions of headband 1 are provided with a plurality of circumferentailly spaced holes which are adapted to register so that the headband may be held in any selected overlapping position of the end portions of strip 1 to suit different head sizes and held in such overlapping position by insertion of collar buttons 1a through the registering holes in said end portions.

Numeral 2 generally denotes a flexible suspension for the handband and safety cap or hat, which suspension is preferably made of molded plastic material, such as polyethylene and is molded in the form of a one piece, dome-shaped, spider-like element having four or other suitable number of radially outwardly extending legs 3, which element is slitted, as shown. The integral end portions 4 of the spider-like legs 3 are bent angularly outwardly, as shown, and are provided with integral, wedge-shaped projections 5, also of the same plastic material, which are adapted to become wedged in corresponding wedge-shaped grooves 6 molded on the inside surface of a safety hat or cap 7, as shown more clearly in FIGS. 2, 3 and 4. Thus, the suspension 2 may be readily attached to or detached from the safety hat or cap by mere wedging or unwedging of portion 5 relative to the wedge-shaped groove 6 of the hat. Since portion 4 is an integral portion of leg 3, it will strongly resist abnormal blows on the hat.

An important feature of the present invention resides in the provision of a plurality of separate pivotal strips 8, also preferably of the same plastic material as suspension 2, which have collars or grommet-like spools or pivots 9 and 10. Pivots 9 provide a pivotal connection between the suspension 2 and strips 8 and pivots 10 provide a pivotal connection between the strips 8 and headband 1. While permanent types of pivots 9 and 10 are shown, these may, instead, be of the readily detachable type, such as by the provision of collar buttons or the like.

By virtue of the freely pivotal movement as the result of the parallelogram-type linkage between the suspension 2 and headband 1, it will be readily seen that the headband is adjustable in girth through a wide range of headband sizes without distortion of the legs 3 of the suspension. That is, the circumference of the headband 1, upon being made larger or smaller, will merely cause slight pivotal rotation of strips 8 in one direction or an opposite direction so as to take up the slack otherwise provided and so as not to distrub the circumferential spacing of the legs 3.

FIGS. 5 and 6 show a modification of the detachable connection between the hat or cap and end portion 4 of the strap. A stud 11 is fastened to the inside of the hat and cooperates with a keyhole slot 12 formed in portion 4. Slot 12 and stud 11 may be interchanged, if desired. Moreover, a plurality of vertically spaced holes may be formed for each pivotal connection between strip 8 and the headband to provide vertical adjustability by selective insertion of collar button 10'. Alternatively, such holes may be placed in strips 8 or legs 3.

Thus it will be seen that I have provided an efficient suspension for safety hats or caps, which suspension is readily adjustable through a wide range of headband sizes without distortion of the crown portion of the suspension; furthermore, I have provided a relatively simple and inexpensive headband suspension which is readily detachable from a safety hat or cap and which is relatively inexpensive to manufacture.

While I have illustrated and described several specific embodiments of my invention, it will be understood that these are by way of illustration only, and that various changes and modifications may be made within the contemplation of my invention and within the scope of the following claims.

I claim:
1. In combination with a safety, head-covering element, a suspension for said element comprising a spider-like element of flexible material for encircling the crown portion of the wearer's head, said suspension being provided with a plurality of radially outwardly extending, integral legs whose integral end portions extend angularly outwardly to form an obtuse angle with respect to said legs, said end portions having readily detachable fastening elements for connection to the interior surface of said head-covering element, a plurality of links, each having one end pivotally connected to a leg portion adjacent the end thereof and interiorly of the suspension, a headband, the other end of said links being pivotally connected to circumferentially spaced portions of said headband, said headband having overlapping ends, means for adjusting the amount of overlap of said end portions of the headband sufficiently so that upon variation of the circumference of the headband to increase or decrease the size thereof, said links will pivot clockwise or counterclockwise about their pivotal connections with the suspension and headband sufficiently to permit a wide range of adjustment of headband size without disturbing the spacing between the legs of said suspension.

2. An adjustable suspension for attachment to wedge-shaped slots disposed on circumferentially spaced positions on the inner surface of a safety hat or cap, a flexible suspension of inverted cup-shaped molded plastic material having a plurality of integral spiderlike arms extending radially outwardly and adapted to surround the crown portion of the wearer's head, wedge-shaped elements integrally secured to the outside surface of the end portions of said arms, said end portions being integral and extending outwardly at an obtuse angle with respect to said arms, a headband having overlapping end portions which are provided with circumferentially spaced, registering holes, means for insertion through said holes to hold the headband in any desired circumferential size, a plurality of links, each having one end pivotally connected to the interior surface of an end portion of one of said arms, and the other end pivotally connected to the headband, whereby upon increasing or decreasing of the circumference of the headband, all of said links will pivotally rock in one direction or in an opposite direction so as to prevent distortion of the suspension and so as to maintain the original circumferential spacing between said arms.

References Cited by the Examiner

UNITED STATES PATENTS

| | | | |
|---|---|---|---|
| 2,981,955 | 5/61 | Ruggiero | 2—3 |
| 3,026,523 | 3/62 | Bowers et al. | 2—3 |
| 3,087,164 | 4/63 | Gilbert | 2—3 |

FOREIGN PATENTS 154,042   4/56   Sweden.

JORDAN FRANKLIN, *Primary Examiner.*
RUSSELL C. MADER, *Examiner.*